US007699159B2

(12) United States Patent
Mori

(10) Patent No.: US 7,699,159 B2
(45) Date of Patent: Apr. 20, 2010

(54) BELT UNIT AND IMAGE FORMING APPARATUS

(75) Inventor: Hirotaka Mori, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 329 days.

(21) Appl. No.: 11/313,779

(22) Filed: Dec. 22, 2005

(65) Prior Publication Data

US 2006/0153607 A1 Jul. 13, 2006

(30) Foreign Application Priority Data

Dec. 28, 2004 (JP) ............................ 2004-381913

(51) Int. Cl.
*B65G 39/00* (2006.01)

(52) U.S. Cl. ....................... 198/807; 198/840; 198/837; 198/842; 193/35 R

(58) Field of Classification Search ................. 198/807, 198/837, 840, 842; 193/35 R
See application file for complete search history.

(56) References Cited

U.S. PATENT DOCUMENTS 3,251,455 A * 5/1966 Lorvi ......................... 198/812
4,986,413 A * 1/1991 Mraz .......................... 198/839
5,017,969 A * 5/1991 Mitomi et al. .............. 399/299
5,044,491 A * 9/1991 Harreither ................... 198/842
5,280,308 A * 1/1994 Takahashi et al. ........... 346/134
5,347,348 A * 9/1994 Nagata ....................... 399/329

FOREIGN PATENT DOCUMENTS

| | | |
|---|---|---|
| JP | 5-124744 | 5/1993 |
| JP | 6-24598 | 2/1994 |
| JP | 06236123 | 8/1994 |
| JP | 8-190319 | 7/1996 |
| JP | 2002-268455 | 9/2002 |

OTHER PUBLICATIONS

Japanese Office Action for Patent Application No. 2004-381913, mailed Jun. 24, 2008, 4 pages.

* cited by examiner

*Primary Examiner*—Gene Crawford
*Assistant Examiner*—Kavel P Singh
(74) *Attorney, Agent, or Firm*—Banner & Witcoff Ltd.

(57) ABSTRACT

A belt unit includes a plurality of rollers including a driving roller and a driven roller; a belt being supported by the plurality of rollers; a specified roller; and a shift restraint member restraining the belt from shifting toward one end side of the specified roller. The specified roller is at least one roller of the plurality of rollers. The specified roller has such a shape that an outer diameter thereof on each of both end sides thereof is continuously enlarged toward a central part thereof in an axial direction thereof, and has such a shape that a region where the outer diameter thereof is the largest is shifted onto one end side thereof with respect to the central part thereof in the axial direction thereof within a belt suspension range.

20 Claims, 2 Drawing Sheets

BELT UNIT AND IMAGE FORMING APPARATUS

CROSS-REFERENCE TO RELATED APPLICATIONS

This application is based on and claims the benefit of priority from the prior Japanese Patent Application No. 2004-381913, filed on Dec. 28, 2004; the entire contents of which are incorporated herein by reference.

BACKGROUND OF THE INVENTION

1. Field of the Invention

The present invention relates to a belt unit in which a belt is supported by a plurality of rollers including a driving roller and a driven roller, a roller which can configure the belt unit, and an image forming apparatus which forms an image on a record medium while conveying the record medium by the belt unit.

2. Description of the Related Art

Heretofore, in a belt unit in which a belt is extended between a driving roller and a driven roller, various configurations have been proposed as measures for preventing a situation where the belt shifts in the widthwise direction thereof, that is, where the position of the belt shifts toward either end side of each roller (for preventing the occurrence of what is called the "deviation of the belt").

There has been, for example, a configuration which includes a guide portion that protrudes from each of both the end parts of the belt in the widthwise direction thereof, toward the inner peripheral side of the belt, and a shift prevention portion that is arranged in a positional relationship where it comes into touch with the corresponding guide portion having shifted together with the belt toward the end side of the roller, and in which the shift of the belt is restrained by the shift prevention portion in cooperation with the guide portion.

There has also been a configuration in which, for the purpose of more stabilizing the state of the belt, tensions that the belt undergoes in a state where this belt is extended over the rollers are made different on both the end sides of each roller, whereby the belt is allowed to shift to only one end side of the roller, and a touch member is disposed in a positional relationship where it can restrain only such a shift.

Considered as a practicable example of the latter is a configuration in which spring members are respectively mounted on both the ends of one roller, the spring members pull the belt by forces different from each other, in the direction of coming away from the other roller, and the magnitudes of the tensions to be exerted on the belt by one roller are made different at both the ends of this roller, whereby the forces of shifting the belt are always exerted in directions in which the shifts of the belt are prevented by the touch members.

However, the spring members for use in such a configuration are structurally difficult to be manufactured so as to have precise pulling forces, and consequently, large errors of or above ten odd % develop in the pulling forces. Therefore, the pulling forces need to be endowed with a large difference in order that the pulling forces at both the ends of one roller may not be reversed under the influence of the errors. Thus, large forces are exerted on, not only the rollers, but also the belt, to give rise to a state where a large load acts on the whole belt unit. Therefore, the configuration cannot be the desirable from the point of the durability of the unit.

In recent years, accordingly, various configurations which do not employ such spring members have also been proposed.

By way of example, there has been proposed a technique (refer to JP-A-08-190319) wherein, on one end side of one of a plurality of rollers (support rollers) constituting a belt (a paper pressing belt 402) (on the side of one end 403*b* of the roller in the axial direction thereof), a shift prevention portion (a flange portion 403*c*) which restrains the roller from shifting (deviating) toward the belt is disposed, while a tapered portion (403*d*) which has an outer diameter larger than on one end side (that is, whose section has a length d2 greater than the length d1 of the section of one end 403*b*) is disposed on the other end side of the roller. Thus, the magnitude of a tension to act on the belt (to urge the belt) is made smaller on the other end side than on one end side so as to exert the force of shifting the belt, in a direction in which the shift of the belt is prevented by the shift prevention portion.

Also, there has been proposed a technique (JP-A-2002-268455) wherein a belt (an endless belt-shaped photosensitive member) is extended between two rollers which are inclinedly arranged so that the peripheral length of the belt may become greater on either of both the end sides of the belt in the widthwise direction thereof, and a guide portion (a deviation stopper guide) is disposed at that end part of the belt at which the peripheral length is greater. Thus, the magnitude of a tension to act on the belt is made larger at one end on the side of the greater peripheral length, than at the other end, so as to always exert the force of shifting the belt, in a direction in which the guide portion comes into touch with the end part of each roller and prevents the shift.

SUMMARY OF THE INVENTION

In the technique mentioned above, the outer diameter of the roller on one end side is made larger than on the other end side (JP-A-08-190319), or the two rollers are held in a positional relationship having an angle therebetween (JP-A-2002-268455), whereby the peripheral length of the belt on one end side of this belt in the widthwise direction thereof is made greater so as to make the tension of this part larger.

In such a configuration, however, the difference of the tensions at both the ends of the belt must be ensured to some extent in order to make greater the peripheral length of the belt on one end side in the widthwise direction thereof, though it is not so large as in the configuration employing the spring members. Therefore, such a tensional difference directly becomes burdens to the belt and the rollers. Besides, since the force of shifting the belt increases due to such a tensional difference, also a load on the shift prevention portion which restrains the shift of the belt enlarges.

The present invention has been made in view of the above circumstances and provides a technique for making a load on the unit smaller than in the related art, in preventing the shift of the belt toward the end side of the roller.

According to an aspect of the invention, a belt unit includes: a plurality of rollers having a driving roller and a driven roller; a belt supported by the plurality of rollers; a specified roller being at least one roller of the plurality of rollers, the specified roller having such a shape that an outer diameter thereof on each of both end sides thereof is continuously enlarged toward a central part thereof in an axial direction thereof, and the specified roller having such a shape that a region where the outer diameter thereof is the largest is shifted onto one end side thereof with respect to the central part thereof in an axial direction thereof within a belt suspension range; and a shift restraint member that restrains the belt from shifting toward the one end side of the specified roller.

BRIEF DESCRIPTION OF THE DRAWINGS

These and other objects and advantages of this invention will become more fully apparent from the following detailed description taken with the accompanying drawings in which.

DESCRIPTION OF THE EMBODIMENTS

Now, embodiments will be described with reference to the drawings.

1. General Configuration

Figure 1:
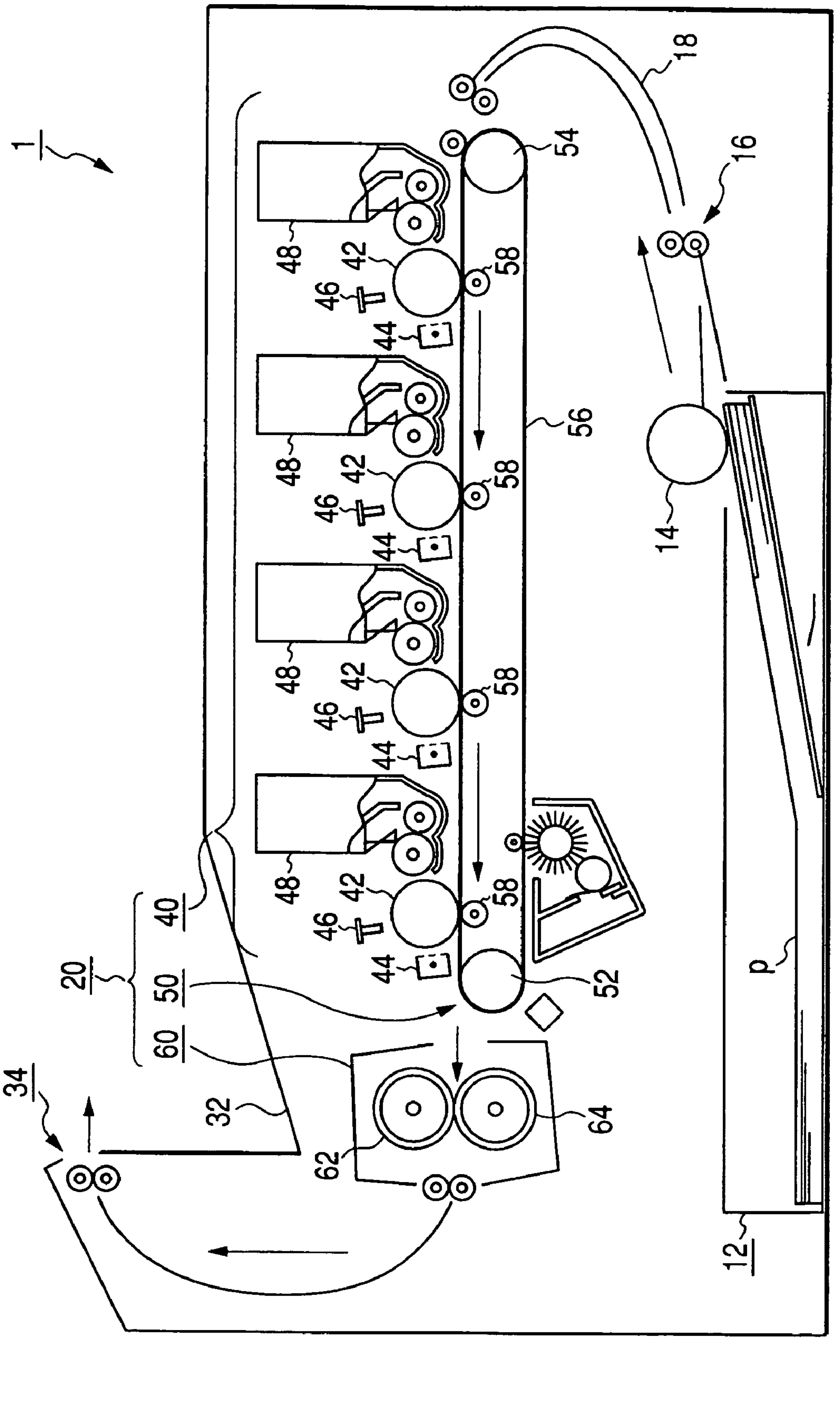
FIG. 1 is a view showing an internal configuration of an image forming apparatus.

As shown in FIG. 1, a color laser printer (hereinafter, simply termed "printer") 1 is an image forming apparatus in which a housing accommodates therein a sheet-of-paper tray 12 that is attachable and detachable in a state where record sheets of paper p are set, a paper feed roller 14 that extracts the record sheets of paper p set in the sheet-of-paper tray 12, one by one, a pair of conveyance rollers 16 that convey the record sheet of paper p extracted by the paper feed roller 14, a guide path 18 that guides the record sheet of paper p conveyed by the conveyance rollers 16, an image formation section 20 that forms images on the record sheet of paper p conveyed in through the guide path 18, a pair of paper ejection rollers 34 that eject the record sheet of paper p formed with the images by the image formation section 20, into an ejection tray 32, and so forth.

The image formation section 20 is configured of image formation units 40 which form the images on the record sheet of paper p, a conveyance unit 50 which conveys the record sheet of paper p conveyed in through the guide path 18, along positions where the images are formed by the image formation units 40 (and a fixation position), a fixation unit 60 which heats and presses the images formed on the record sheet of paper p by the image formation units 40, in order to fix the images onto the record sheet of paper p, and so forth.

Among the above constituents, the plurality of image formation units 40 are arranged along a direction in which the record sheet of paper p is conveyed by the conveyance unit 50 (refer to arrows in FIG. 1, and the same shall apply in the ensuing description). Each of the image formation units 40 is configured of a photosensitive drum 42, an electric charger 44 which charges the photosensitive drum 42, a scanner portion 46 which forms an electrostatic latent image on the photosensitive drum 42, a development portion 48 which sticks a developer onto the photosensitive drum 42 so as to form a developer image, and so forth. Besides, the developer image formed on the photosensitive drum 42 by the scanner portion 46 is transferred onto the record sheet of paper p conveyed in by the conveyance unit 50, whereby the image is formed on the record sheet of paper p. Incidentally, the image formation units 40 are capable of forming the images in respectively different colors (in the four colors of cyan (C), magenta (M), yellow (Y) and black (K) in this embodiment).

The charger 44 in each image formation unit 40 is, for example, a positively-charging charger of scolotron type which generates a corona discharge from charging wire made of tungsten or the like, so as to uniformly charge the surface of the photosensitive drum 42 in the positive polarity. Besides, the scanner portion 46 is configured of a laser generator which generates a laser beam for forming the electrostatic latent image on the surface of the photosensitive drum 42, lenses, etc. Incidentally, regarding each scanner portion 46 shown in FIG. 1, most parts are omitted from illustration, and only a part from which the laser beam is finally emergent is illustrated. Thus, the scanner portion 46 scans the surface of the photosensitive drum 42 with the laser beam emitted from the laser beam emission part, thereby to form the electrostatic latent image on the surface of the photosensitive drum 42. The electrostatic latent image is transferred onto the record sheet of paper p conveyed in by the conveyance unit 50, whereby the image is formed on the surface of this record sheet of paper p.

The conveyance unit 50 is configured of a driving roller 52 which is arranged on a downstream side in the conveyance path of the record sheet of paper p and which is rotated by receiving power from a motor 84 to be stated later, a driven roller 54 which is arranged on an upstream side in the conveyance path of the record sheet of paper p, an endless conveyance belt 56 which is extended between the driving roller 52 and the driven roller 54, transfer rollers 58 which are arranged at positions opposing to the photosensitive drums 42 in the image formation units 40 through the conveyance belt 56, and so forth.

Figure 2:
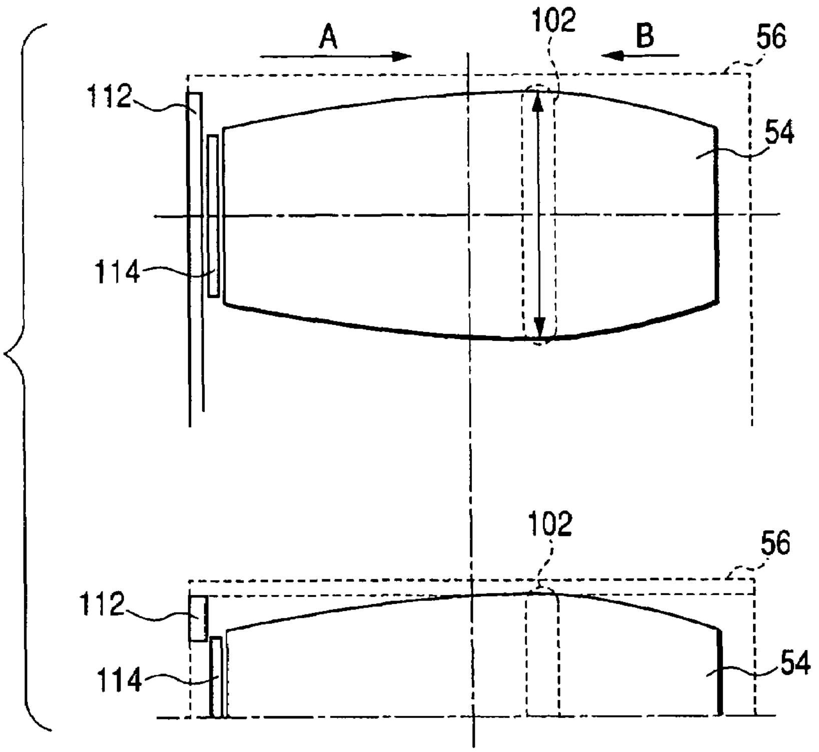
FIG. 2 is a diagram showing an main portions of a conveyance unit.

As shown in FIG. 2, the driven roller 54 in the conveyance unit 50 is configured by a crown roller in a shape in which the outer diameter of this roller is enlarged continuously from each of both the end sides of this roller toward a central part in an axial direction (hereinafter, referred to as "lengthwise direction") thereof. In the driven roller 54, a region 102 in which the outer diameter becomes the largest (hereinafter, termed "largest-diameter region") is located shifting (deviating) onto one end side of this roller (a right side in FIG. 2) with respect to the central part in the lengthwise direction within a belt suspension range, for example, the central part in the lengthwise direction in a case where the belt 56 is suspended over the whole region of this roller in the longitudinal direction thereof. Incidentally, FIG. 2 shows a state where the outer diameter of the driven roller 54 varies largely to a visible degree, in order to facilitate the understanding of the embodiments. However, such a large variation is not always necessary, but the outer diameter may well be in an invisible degree of variation state.

Besides, the conveyance belt 56 has a width (a length along the lengthwise direction of each roller constituting the conveyance unit 50 (hereinafter, simply termed "roller") which is greater than the lengths of the driving roller 52 and the driven roller 54, and both the ends of the conveyance belt 56 in the widthwise direction thereof reach outer sides beyond both the ends of the roller (positions spaced from roller end parts along the lengthwise direction of the roller).

Besides, in a region lying on the other side of the roller (a left side in FIG. 2) in those regions of the conveyance belt 56 which lie outside both the ends of the roller in this manner, a guide portion 112 is disposed so as to protrude toward the inner peripheral side of the conveyance belt 56 over the whole inner peripheral surface thereof. Further, a shift prevention portion 114 which prevents the shift of the guide portion 112 is disposed inside this guide portion 112 (between the guide portion 112 and the other end of each roller). By way of example, the shift prevention portion 114 may be a rotary member which rotates unitarily with the roller, or it may well be a rotary member which is supported so as to be freely rotatable round the axis of the roller and separately from the roller. The guide portion 112 and the shift prevention portion 114 are disposed in such a positional relationship that the guide portion 112 comes into touch with the shift prevention portion 114 when the conveyance belt 56 has shifted toward one end side of the roller. Thus, the guide portion 112 and the shift prevention portion 114 function to restrain the conveyance belt 56 from shifting toward one end side of the roller, owing to the touch of both these portions. Incidentally, although the conveyance belt 56 essentially warps so as to come into close touch with the surface of the roller, it is illustrated as being flat, for the sake of convenience in FIG. 2.

The fixation unit 60 is configured of a heating roller 62 in which a halogen lamp is accommodated along the axial direction of a metallic elementary pipe formed with a mold releasing layer at the surface thereof, a pressing roller 64 which conveys the record sheet of paper p conveyed in by the conveyance unit 50, toward the paper ejection rollers 34 in a state where the record sheet of paper p is pressed between this pressing roller 64 and the heating roller 62, and so forth. The halogen lamp accommodated in the heating roller 62 heats the surface of this heating roller 62 to such a temperature (fixation temperature) that the developer images transferred on the record sheet of paper p can be fixed.

2. Control System

Figure 3:
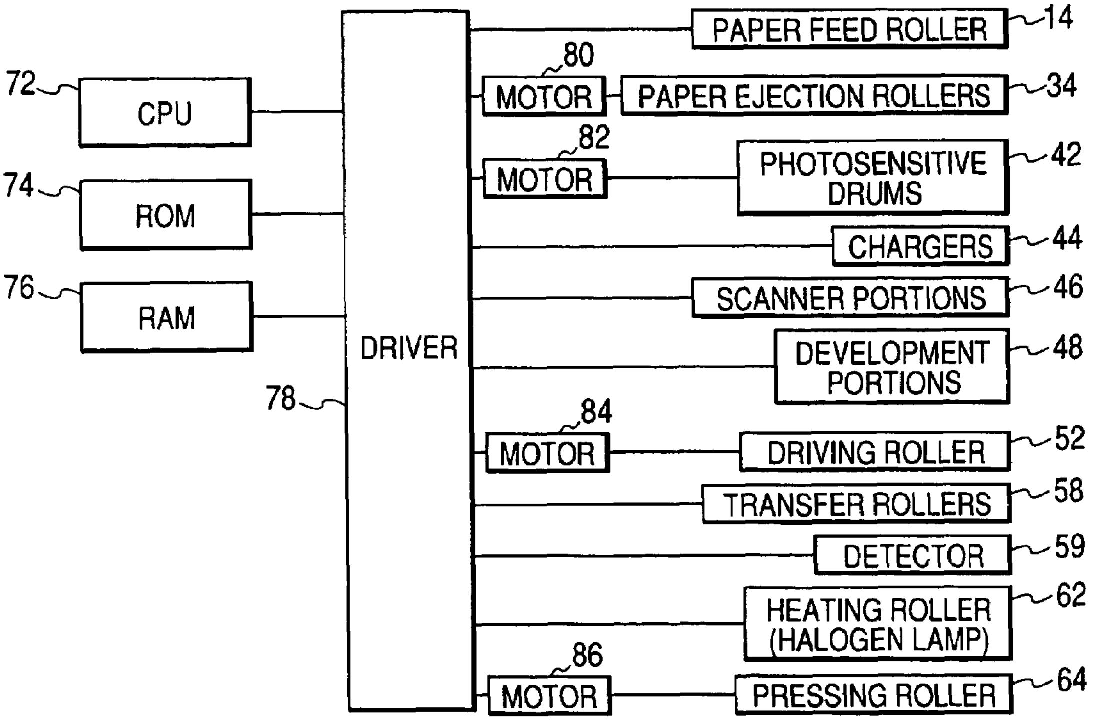
FIG. 3 is a block diagram showing the control system of the image forming apparatus.

Besides, as shown in FIG. 3, the printer 1 includes therein a CPU 72 which controls the operations of the whole printer 1, a ROM 74 in which the procedures of processing by the CPU 72, etc. are stored, a RAM 76 in which the results of the processing by the CPU 72, etc. are stored, a driver 78 which generates command signals for various portions included in the printer 1, and so forth, and a control system is configured of these constituents. The driver 78 is configured of drive circuits which serve to drive motors (80-86) for rotating the paper feed roller 14, the conveyance rollers 16 and the paper ejection rollers 34, and also the rollers that configure the image formation units 40, the conveyance unit 50, the fixation unit 60, etc.; control circuits which control the charging based on the chargers 44 in the image formation units 40, the laser irradiations based on the scanner portions 46, etc.; drive circuits which serve to apply bias voltages to the photosensitive drums 42 as will be stated later; and so forth.

Incidentally, the conveyance of the record sheet of paper p by the conveyance unit 50 is controlled by an encoder which is configured of a slit pattern formed on the inner peripheral surface of the conveyance belt 56, and a detector 59 for detecting the slit pattern, as will be stated later. The motor 84 for rotating the driving roller 52 is feedback-controlled on the basis of an encoder signal which indicates the slit pattern detected by the detector 59, thereby to control the rotational speed of the driving roller 52, that is, the speed of the conveyance by the conveyance belt 56.

When the CPU 72 has received from outside a command to the effect that images are to be formed (for example, a command from a manipulation panel not shown, or a command from another device which is connected through an interface not shown), it controls the operations of the whole printer 1 in accordance with programs stored in the ROM 74, thereby to execute processes as stated below. (1) First, the various portions of the printer 1 are initialized. Incidentally, the heating of the heating roller 62 in the fixation unit 60 is also started at the time of the initialization. (2) Subsequently, in each of the image formation units 40, the surface of the photosensitive drum 42 is uniformly charged by the charger 44, and the photosensitive drum 42 is thereafter irradiated with the laser beam modulated on the basis of the image information of the image to-be-formed, by the scanner portion 46, thereby to form an electrostatic latent image on the surface of the photosensitive drum 42. (3) Subsequently, in each of the image formation units 40, the developer is deposited onto the surface of the photosensitive drum 42 by the development portion 48, thereby to visualize the electrostatic latent image on the surface of the photosensitive drum 42. (4) Thereafter, in each of the image formation units 40, the photosensitive drum 42 is rotated, thereby to move the visualized image (developer image) to a predetermined transfer position. (5) Besides, the paper feed roller 14 and the conveyance rollers 16 are rotated, thereby to feed the record sheet of paper p to the conveyance unit 50, and the driving roller 52 of the conveyance unit 50 is rotated, thereby to start the conveyance of the record sheet of paper p by the conveyance belt 56. (6) Simultaneously with the conveyance of the record sheet of paper p by the conveyance unit 50 in the processes thus far described, predetermined bias voltages (transfer bias voltages) are successively applied between the photosensitive drums 42 in the image formation units 40 and the transfer rollers 58 in the conveyance unit 50, whereby the visible images visualized on the surfaces of the photosensitive drums 42 are transferred onto the surface of the record sheet of paper p. (7) Thereafter, the pressing roller 64 in the fixation unit 60 is rotated so as to convey the record sheet of paper p while this record sheet of paper is being heated and pressed, thereby to fix the visible images on the surface of the record sheet of paper p. (8) Besides, the above steps (2)-(7) are repeated in accordance with the image information of the images to-be-formed, and the paper ejection rollers 34 are thereafter rotated, thereby to eject the record sheets of paper p onto the paper ejection tray 32, whereupon the operations of the various portions are ended.

3. Operations and Advantages

In the conveyance unit 50 in the printer 1 described above, the driven roller 54 is the crown roller whose outer diameter is continuously enlarged from each of both the ends of this roller toward the central part of this roller in the lengthwise direction thereof, and hence, the tension of the conveyance belt 56 extended over the driven roller 54, in the widthwise direction of this conveyance belt (in the lengthwise direction of the roller) can be distributed so as to enlarge toward the central part of the roller. Owing to such a tensional distribution, when the conveyance belt 56 extended over the driven roller 54 has been driven, a force by which the conveyance belt 56 is shifted from each of the end sides of the belt 54 in the widthwise direction thereof, toward the central part of the roller 54 in the lengthwise direction thereof can be always exerted on the conveyance belt 56.

Besides, the largest-diameter region 102 in which the outer diameter of the driven roller 54 becomes the largest is located shifting onto one end side of the roller with respect to the central part of the roller in the lengthwise direction thereof within the belt suspension range, that is, the central part of the roller in the lengthwise direction in the example shown in FIG. 2. Therefore, the tension of the conveyance belt 56 extended over the driven roller 54, in the widthwise direction thereof, becomes the largest at a position shifting onto one end side of the roller with respect to the central part thereof. Thus, the force by which the conveyance belt 56 is shifted toward the central part of the driven roller 54 in the lengthwise direction thereof is predominant on the other end side on which the touch area of the conveyance belt 56 is larger, with a boundary at the largest-diameter region 102 (refer to arrows A and B in FIG. 2). As a result, a force by which the whole conveyance belt 56 is shifted can be always exerted in a direction toward one end side of the roller 54 (refer to the arrow A in FIG. 2).

Here, when the conveyance belt 56 has shifted toward one end side of the roller 54 in this manner, the guide portion 112 which shifts together with the conveyance belt 56 touches the shift prevention portion 114 and hitches thereon, whereby the shift of the conveyance belt 56 can be restrained. Therefore, the conveyance belt 56 is prevented from unnecessarily shifting and falling off the roller 54. Moreover, in this case, the force by which the conveyance belt 56 is shifted functions so that the guide portion 112 may hitch on the shift prevention portion 114 so as to pull the belt 56 along the widthwise direction thereof. Therefore, the conveyance belt 56 is prevented from buckling along its widthwise direction. Accordingly, the conveyance belt 56 need not be endowed with a strength which counteracts the force of causing this conveyance belt 56 to buckle along its widthwise direction.

In this manner, in the conveyance unit 50, the largest-diameter region 102 of the driven roller 54 is located shifting onto one end side with respect to the central part of the roller 54 in the lengthwise direction thereof, whereby the force by which the conveyance belt 56 extended over the roller 54 is shifted is caused to predominate on the other end side of the roller 54. Thus, the force by which the conveyance belt 56 is shifted can be generated. Therefore, loads on the conveyance belt 56 and the driven roller 54 attributed to such a large tensional difference can be reduced.

Besides, the force which shifts the conveyance belt 56 predominates on the other end side of the roller 54 results from the fact that the force generated on the other end side cancels the force generated on one end side. Usually, therefore, the force which shifts the conveyance belt 56 is difficult to become large. Since, however, a small force suffices for shifting the conveyance belt 56, no problem is posed in this regard. Conversely, as the force of shifting the conveyance belt 56 is smaller, loads on the respective portions of the conveyance unit 50, especially the shift prevention portion 114, can be made smaller. Therefore, the above configuration in which the force of shifting the conveyance belt 56 can be made small in this manner can be the a configuration which is well suitable in the point of durability.

Besides, in the conveyance unit 50 described above, the driven roller 54 is in the shape in which the outer diameter is continuously enlarged from both the end parts toward the central part. This is intended to facilitate the formation of the roller itself more than in a case where the driving roller 52 is set as a roller of such shape. Besides, it is thus realized to suppress the manufacturing cost of the conveyance unit 50, in turn, the whole printer 1.

Concretely, the driving roller 52 in the conveyance unit 50 must be constructed so as to become larger in friction with the conveyance belt 56 than the driven roller 54, for the purpose of reliably transmitting the driving force of this roller 52 to the conveyance belt 56. For this purpose, a special process such as subjecting the surface of the roller 52 to a predetermined coating or forming the roller 52 by employing a specified resin material is necessitated. In contrast, such a process is not necessary for the driven roller 54, machining into the above shape can be facilitated by employing, for example, a member of easy machining (for example, a metal member). Besides, it is consequently possible to suppress the manufacturing cost of the conveyance unit 50.

4. Modifications

Although the embodiments has been described above, it is needless to say that the invention is not restricted to the foregoing embodiments at all, but that it can adopt various aspects as long as they fall within the technical scope thereof.

By way of example, the embodiment has exemplified the configuration in which the specified roller is applied to the driven roller 54 of the conveyance unit 50. The specified roller, however, can also be applied to the driving roller 52 in the conveyance unit 50. In this case, a configuration in which the specified roller is applied to only the driving roller 52 may be adopted, but a configuration in which such specified rollers are applied to both the driving roller 52 and the driven roller 54 may well be adopted. Besides, in case of a configuration in which the conveyance unit 50 includes a plurality of driven rollers, a configuration in which the specified roller is applied to each of the plurality of driven rollers may well be adopted.

Besides, the conveyance unit 50 in the embodiment has exemplified the configuration in which the shift prevention portion 114 is disposed as the separate member between the guide portion 112 and the other end of the roller. It is also allowed, however, to adopt a configuration in which the protrusion magnitude of the guide portion 112 protruding from the conveyance belt 56 is adjusted so that the guide portion 112 may touch the other end of the roller when the conveyance belt 56 has shifted onto one end side of the roller, in other words, so that the other end part of the roller may function as the shift prevention portion 114.

Besides, in the conveyance unit 50 described above, the forces which are generated on one end side and the other end side of the driven roller 54 with the boundary at the largest-diameter region 102 become intenser, respectively, as the touch areas of the conveyance belt 56 with the surface of the driven roller 54 are larger. It is therefore desirable for reducing the force of finally shifting the conveyance belt 56 that the difference of the touch areas of the conveyance belt 56 on both the end sides is made sufficiently small by a configuration in which the largest-diameter region 102 is located sufficiently close to the central part. However, in a case where a disturbance which reverses the shifting direction of the conveyance belt 56 might occur, the position of the largest-diameter region 102 needs to be spaced from the central part to the extent that the shifting direction is not reversed even under the influence of such a disturbance.

Besides, the embodiment has exemplified the configuration in which the guide portion 112 and the shift prevention portion 114 are disposed on the other end side of the roller. These elements, however, may well be disposed on one end side of the roller. In this case, the guide portion 112 may be arranged so as to protrude from the region of the conveyance belt 56 lying on one end side of the roller, toward the inner peripheral surface thereof, while the shift prevention portion 114 may be arranged outside the guide portion 112 (at a position spaced from the other end of the roller with respect to the guide portion 112). According to this configuration, when the conveyance belt 56 has shifted toward one end side of the roller, the guide portion 112 is pressed against the shift prevention portion 114, whereby the shift of the conveyance belt 56 can be restrained.

Besides, the embodiment has exemplified the configuration in which the driven roller 54 is configured by the crown roller, but any roller other than the crown roller can also be employed as long as it has the shape in which the outer diameter of the roller is continuously enlarged from both the end parts of the roller toward the central part thereof. Considered as a practicable example is a roller in such a shape that two truncated cones (each of which is a bottom side part obtained when a cone is cut at a certain height from its bottom surface and along a plane parallel to its bottom surface) whose bottom surfaces have equal sizes are joined to each other at the bottom surfaces.

Besides, the embodiment has exemplified the configuration in which the belt unit is applied to the conveyance unit 50. The belt unit, however, can also be applied to another constituent in accordance with the configuration of a printer. In a case, for example, where the printer is configured so that each visible image with an electrostatic latent image visualized may be formed on a record sheet of paper by forming the electrostatic latent image on a latent image carrier, visualizing the electrostatic latent image with a developer and thereafter transferring the visualized image onto the record sheet of paper through an intermediate transfer member, and where the latent image carrier is a photosensitive belt unit in which a photosensitive belt is extended over a plurality of rollers, the belt unit can also be applied as the photosensitive belt unit.

Besides, in a case where the printer 1 is configured so that each visible image with an electrostatic latent image visualized may be formed on a record sheet of paper by forming the electrostatic latent image on a latent image carrier, visualizing the electrostatic latent image with a developer and thereafter transferring the visualized image onto the record sheet of paper through an intermediate transfer member, and where the intermediate transfer member is an intermediate transfer belt unit in which an intermediate transfer belt is extended over a plurality of rollers, the belt unit can also be applied as the intermediate transfer belt unit.

5. Other Items

In the embodiment described before, the conveyance belt 56 is the belt unit, the driven roller 54 is the specified roller, and the guide portion 112 and the shift prevention portion 114 configure a shift restraint member.

According to the above-embodiments, the specified roller has the outer diameter which is continuously enlarged from both the ends of the roller toward the central part of the roller in the lengthwise direction thereof. Therefore, tensions in the widthwise direction of the belt extended over the specified roller (in the lengthwise direction of the roller) can be distributed so as to enlarge toward the central part. Owing to such a tensional distribution, in driving the belt extended over the specified roller, the forces of shifting the belt from the respective end sides of the belt in the widthwise direction thereof, toward the central part of the roller in the lengthwise direction thereof can be always exerted on the belt.

Besides, the region where the outer diameter of the specified roller is the largest (hereinafter, termed the “largest-diameter region”) is located shifting onto one end side with respect to the central part of the roller in the lengthwise direction thereof within a region where the belt is suspended, namely, the belt suspension range. Therefore, the tension of the belt extended over the roller, in the widthwise direction of the roller becomes the largest at a position which shifts onto one end side with respect to the central part. Thus, the force of shifting the belt toward the central part of the roller in the lengthwise direction thereof becomes predominant on the other end side on which the belt has a larger touch area, with a boundary at the largest-diameter region. As a result, the force of shifting the whole belt can be always exerted in a direction toward one end side of the roller.

Besides, such a shift of the belt in the direction toward one end side is restrained by the shift restraint member, so that the belt is prevented from shifting unnecessarily.

In this manner, in the belt unit, the largest-diameter region of the specified roller is located shifting onto one end side with respect to the lengthwise central part within the belt suspension range, and the force of shifting the conveyance belt extended over the roller is caused to predominate on the other end side of the roller. Thus, the force of shifting the belt can be generated without bestowing a large difference between tensions which are exerted on the belt at both the end sides of the specified roller. Accordingly, loads on the belt and the specified roller attributed to such a large tensional difference can be reduced.

Besides, the force which shifts the conveyance belt predominates on the other end side of the specified roller results from the fact that the force generated on the other end side cancels the force generated on one end side. Usually, therefore, the force which shifts the conveyance belt is difficult to become large. Since, however, a small force suffices for shifting the belt, no problem is posed in this regard. Conversely, as the force of shifting the belt is smaller, loads on the respective portions of the belt unit, especially the shift prevention portion, can be made smaller. Therefore, the above configuration in which the force of shifting the belt can be made small in this manner can be the a configuration which is well suitable in the point of durability.

Incidentally, as stated above, the forces which are generated on one end side and the other end side of the specified roller with the boundary at the largest-diameter region become intenser, respectively, as the touch areas of the belt with the surface of the specified roller are larger. It is therefore desirable for reducing the force of finally shifting the belt that the difference of the touch areas of the belt on both the end sides is made sufficiently small by a configuration in which the largest-diameter region is located sufficiently close to the central part. However, in a case where a disturbance which reverses the shifting direction of the belt might occur, the position of the largest-diameter region needs to be spaced from the central part to the extent that the shifting direction is not reversed even under the influence of such a disturbance.

Besides, the shift restraint member stated above is a member which restrains the belt from shifting, and it is disposed in order to restrain the belt from shifting toward one end side of the specified roller. The shift restraint member may comprise a guide portion being disposed so as to protrude from a region where at least one of an inner peripheral surface thereof and an outer peripheral surface thereof is located on an end side of the specified roller; and a shift prevention portion being disposed in a positional relationship where the guide portion having shifted toward the one end side of the specified roller and together with the belt at least partially comes into contact with the shift prevention portion, and the shift prevention portion that prevents the guide portion from shifting toward the one end side of the specified roller, by contacting the guide portion with the sift prevention portion.

According to the above-embodiments, when the belt has shifted onto one end side of the specified roller, the guide portion disposed on the belt comes into touch with the shift prevention portion, and hence, the shift of the guide portion is prevented, so that the shift of the belt itself can be consequently restrained.

Incidentally, the guide portion and the shift prevention portion in this configuration are not especially restricted in practicable configurations as long as they are disposed so as to be capable of restraining the shift of the belt. There is considered, for example, a configuration in which the guide portion is disposed in the region of the inner peripheral surface or outer peripheral surface of the belt as lies on one end side of the specified roller, while the shift prevention portion is disposed so as to lie on the outer side of the specified roller beyond the guide portion (at a position remoter from one end of the specified roller with respect to the guide portion).

According to this configuration, when the belt has shifted toward one end side of the specified roller, the guide portion is pressed against the shift prevention portion, whereby the shift of the belt can be restrained.

With this configuration, however, the force of shifting the belt acts so as to press the guide portion against the shift prevention portion and to compress the belt along the widthwise direction thereof. Therefore, unless the strength of the belt itself is sufficient, the belt might buckle along the widthwise direction. In order to prevent such a drawback without heightening the strength of the belt, a configuration is desirable in which the force of shifting the belt acts so as not to compress the belt in the widthwise direction. The guide portion may be disposed so as to protrude from a region where at least one of an inner peripheral surface thereof and an outer peripheral surface thereof is located on the other end side of the specified roller. The shift prevention portion of the shift restraint member may be disposed on a central side of the specified roller with respect to the guide portion.

According to the above-embodiments, when the belt has shifted toward one end side of the specified roller, the guide portion hitches on the shift prevention portion, whereby the shift of the belt can be restrained. In this case, the force of shifting the belt acts so that the guide portion may hitch on the shift prevention portion to pull the belt along the widthwise direction thereof, and hence, the belt does not buckle along the widthwise direction. Therefore, the belt need not be endowed with a strength which counteracts the force of causing the belt to buckle along the widthwise direction.

a roller in such a shape that two truncated cones (each of which is a bottom side part obtained when a cone is cut at a certain height from its bottom surface and along a plane parallel to its bottom surface) whose bottom surfaces have equal sizes are joined to each other at the bottom surfaces. The specified roller may be a crown roller.

According to the above-embodiments, the crown roller is a roller in a shape in which the outer diameter of the roller is continuously enlarged from both the end parts of the roller toward the central part thereof. Therefore, the crown roller can be adopted as the above specified roller, merely in such a way that a largest-diameter region in which the outer diameter consequently becomes the largest is located shifting one end side of the roller.

Besides, the above specified roller may be any roller among the plurality of rollers which include the driving roller and the driven roller. At least one driven roller may be formed as the specified roller.

According to the above-embodiments, as compared with a case where the driving roller is set as the specified roller, the formation of the specified roller becomes easier, with the result that the manufacturing cost of the belt unit can be suppressed more.

Concretely, the driving roller in the belt unit must be constructed so as to become larger in friction with the belt than the driven roller, for the purpose of reliably transmitting the driving force of this driving roller to the belt. For this purpose, a special process such as subjecting the surface of the driving roller to a predetermined coating or forming the roller by employing a specified resin material is necessitated. In contrast, such a process is not necessary for the driven roller, and the specified roller of the above configuration can be easily formed by employing, for example, a member of easy machining (for example, a metal member), with the result that the manufacturing cost of the belt unit can be suppressed.

According to the roller thus configured, part of the belt unit according the above-embodiments (the specified roller) can be configured, so that the same operations and advantages as the embodiments can be attained by configuring the belt unit by the use of the roller.

Incidentally, as the practicable configuration of the roller, there is considered, for example, a roller in such a shape that two truncated cones whose bottom surfaces have equal sizes are joined to each other at the bottom surfaces. A crown roller is considered. Besides, this roller may be any of a plurality of rollers in a case, for example, where it is employed for a belt unit in which a belt is extended over a driving roller and a driven roller.

According to the above-embodiments, an image formation apparatus further includes a latent image carrier on which an electrostatic latent image is formed so that an image with the electrostatic latent image visualized is formed on a record medium and an intermediate transfer member through which the visualized image is transferred onto the record medium. The latent image carrier is a photosensitive belt unit in which a photosensitive belt is supported by a plurality of rollers. The belt unit according to the embodiment is employed as the photosensitive belt unit.

By thus configuration, the belt unit is employed as the conveyance belt unit, so that the same operations and advantages as the embodiments can be thus attained.

According to the above-embodiments, an image forming apparatus further includes: a latent image carrier on which an electrostatic latent image is formed so that an image with the electrostatic latent image visualized is formed on a record medium and an intermediate transfer member through which the visualized image is transferred onto the record medium. The intermediate transfer member is an intermediate transfer belt unit in which an intermediate transfer belt is supported by a plurality of rollers. The belt unit according to the embodiments is employed as the intermediate transfer belt unit.

By thus configuration, the belt unit is employed as the conveyance belt unit, so that the same operations and advantages as the embodiments can be thus attained.

What is claimed is:

1. A belt unit, comprising:

a plurality of rollers that comprises a driving roller and a driven roller;

a belt being supported by the plurality of rollers;

a specified roller being at least one roller of the plurality of rollers, the specified roller having such a shape that an outer diameter thereof on each of both end sides thereof is continuously enlarged toward a central part thereof in an axial direction thereof, and the specified roller having such a shape that a region where the outer diameter thereof is the largest is shifted onto one end side thereof with respect to the central part thereof in the axial direction thereof within a belt suspension range; and a shift restraint member that restrains the belt from shifting toward the one end side of the specified roller.

2. A belt unit according to claim 1, wherein the shift restraint member comprises:

a guide portion being disposed so as to protrude from a region where at least one of an inner peripheral surface thereof and an outer peripheral surface thereof is located on an end side of the specified roller; and a shift prevention portion being disposed in a positional relationship where the guide portion having shifted toward the one end side of the specified roller and together with the belt at least partially comes into contact with the shift prevention portion, and the shift prevention portion that prevents the guide portion from shifting toward the one end side of the specified roller, by contacting the guide portion with the shift prevention portion.

3. A belt unit according to claim 2, wherein the guide portion is disposed so as to protrude from a region where at least one of an inner peripheral surface thereof and an outer peripheral surface thereof is located on the other end side of the specified roller, the shift prevention portion of the shift restraint member is disposed on a central side of the specified roller with respect to the guide portion.

4. A belt unit according to claim 1, wherein the specified roller is a crown roller.

5. A belt unit according to claim 4, wherein at least one driven roller is formed as the specified roller.

6. An image forming apparatus comprising:

a plurality of rollers that comprises a driving roller and a driven roller;

a belt being supported by the plurality of rollers;

a specified roller being at least one roller of the plurality of rollers, the specified roller having such a shape that an outer diameter thereof on each of both end sides thereof is continuously enlarged toward a central part thereof in an axial direction thereof, and the specified roller having such a shape that a region where the outer diameter thereof is the largest is shifted onto one end side thereof with respect to the central part thereof in the axial direction thereof within a belt suspension range; and a shift restraint member that restrains the belt from shifting toward the one end side of the specified roller.

7. An image forming apparatus according to claim 6, wherein the shift restraint member comprises:

a guide portion being disposed so as to protrude from a region where at least one of an inner peripheral surface thereof and an outer peripheral surface thereof is located on an end side of the specified roller; and a shift prevention portion being disposed in a positional relationship where the guide portion having shifted toward the one end side of the specified roller and together with the belt at least partially comes into contact with the shift prevention portion, and the shift prevention portion that prevents the guide portion from shifting toward the one end side of the specified roller, by contacting the guide portion with the shift prevention portion.

8. An image forming apparatus according to claim 7, wherein the guide portion is disposed so as to protrude from a region where at least one of an inner peripheral surface thereof and an outer peripheral surface thereof is located on the other end side of the specified roller, the shift prevention portion of the shift restraint member is disposed on a central side of the specified roller with respect to the guide portion.

9. An image forming apparatus according to claim 6, wherein the specified roller is a crown roller.

10. An image forming apparatus according to claim 9, wherein at least one driven roller is formed as the specified roller.

11. An image forming apparatus according to claim 6, wherein a belt unit comprises the plurality of rollers, the belt, the specified roller, and the shift restraint member, and wherein an image is formed on a record medium while the record medium is being conveyed by the belt unit.

12. An image forming apparatus according to claim 6, further comprising:

a latent image carrier on which an electrostatic latent image is formed so that an image with the electrostatic latent image visualized is formed on a record medium and an intermediate transfer member through which the visualized image is transferred onto the record medium, wherein the latent image carrier is a photosensitive belt unit in which a photosensitive belt is supported by a plurality of rollers, wherein a belt unit comprises the plurality of rollers, the belt, the specified roller, and the shift restraint member, and wherein the belt unit is employed as the photosensitive belt unit.

13. An image forming apparatus according to claim 6, further comprising:

a latent image carrier on which an electrostatic latent image is formed so that an image with the electrostatic latent image visualized is formed on a record medium and an intermediate transfer member through which the visualized image is transferred onto the record medium, wherein the intermediate transfer member is an intermediate transfer belt unit in which an intermediate transfer belt is supported by a plurality of rollers, wherein a belt unit comprises the plurality of rollers, the belt, the specified roller, and the shift restraint member, wherein the belt unit is employed as the intermediate transfer belt unit.

14. An image forming apparatus comprising:

a plurality of rollers including:

a driving roller, and a driven roller;

a belt supported by the driving roller and the driven roller; and a shift restraint member that restrains the belt from shifting toward a first end side of a first roller of the plurality of rollers, wherein the first roller has an outer diameter which continuously increases in an axial direction from each end of the first roller toward a section of the first roller having an outer diameter larger than each other section of the first roller, and being axially offset from a center of the first roller within a belt suspension range.

15. A belt unit, comprising:

a plurality of rollers; and a belt being supported by the plurality of rollers;

wherein at least one roller of the plurality of rollers has a cylindrical crown shape, the cylindrical crown shape having a largest diameter at a region located between a center and an end side of the at least one roller along a central axis of the cylindrical crown shaper wherein the largest diameter is greater than a diameter at the center of the at least one roller.

16. The belt unit according to claim 15, further comprising:

a shift restraint member that restrains the belt from shifting toward the end side of the at least one of the plurality of rollers having the shape.

17. The belt unit according to claim 15, wherein the belt extends over and contacts outer surfaces of the at least one of the plurality of rollers having the shape.

18. The belt unit according to claim 15, wherein the cylindrical crown shape has a smallest diameter at either end side.

19. The belt unit according to claim 15, wherein the plurality of rollers comprise a driving roller and a driven roller.

20. A belt unit, comprising:

a plurality of rollers, at least one roller of the plurality of rollers having a largest diameter at a first side from a central part thereof, wherein the largest diameter is greater than a diameter at a center of the at least one roller;

a belt being supported by the plurality of rollers; and a shift restraint member that restrains the belt from shifting toward the first side, the shift restraint member configured to contact an end portion of the at least one of the plurality of rollers at a second side opposite to the first side.

* * * * *